United States Patent Office 3,505,168
Patented Apr. 7, 1970

3,505,168
HEAT-SEALABLE LAMINAR STRUCTURES OF POLYIMIDES AND METHODS OF LAMINATING
James F. Dunphy, Eggertsville, and Darrell J. Parish, Tonawanda, N.Y., assignors to E. I. du Pont de Nemours and Company, Wilmington, Del., a corporation of Delaware
No Drawing. Filed Sept. 4, 1964, Ser. No. 394,614
Int. Cl. B32b *27/28, 27/34*
U.S. Cl. 161—227           4 Claims

ABSTRACT OF THE DISCLOSURE

A heat-sealable laminar structure is provided having at least two layers of polyimide polymeric material wherein the polyimide of one of said layers is different from the polyimide of the other layer. Each different polyimide being the reaction product of different pairings of certain primary diamines and certain aromatic tetracarboxylic acids or anhydrides to provide at least one layer that is heat sealable. The heat sealable layer may also be applied as the corresponding precursor amide-acid or polyiminolactone.

---

This invention relates to polymeric structures and more particularly to polyimide films.

Because of the intractability of many polyimides and because of the high temperature limitations of commercially available adhesives, attempts to bond a polyimide surface to a polyimide surface have not been entirely satisfactory. For example, the use of adhesives has the disadvantage that commercially available adhesives lack sufficient thermal stability radiation resistance or flexibility for most end uses of the polyimide.

Even where good polyimide-to-polyimide adhesion is obtained, a large number of polyimides have been unacceptable in their heat-sealing characteristics. Thus, most polyimide-to-polyimide structures, e.g., film laminates, will not heat seal satisfactorily. Some heat sealable coatings lack satisfactory storage or shelf stability for good all-around heat-sealability properties. Such structures have their heat-sealing properties diminish or deteriorate with time, with resulting erratic or unsatisfactory heat-sealing after even a short storage period. For these reasons, there has been a great need for heat-sealable polyimide structures which do not lose their heat-sealability on storage and in which all layers have thermal stability of the same order of magnitude.

According to the present invention, a remarkable improvement in heat-sealing properties is achieved when the coating polyimides of a polyimide-to-polyimide structure are each selected from a specific narrow class of polyimides.

The base polyimide of the polyimide-to-polyimide composite structure of this invention is a polyimide characterized by a recurring unit having the following structural formula:

(1)
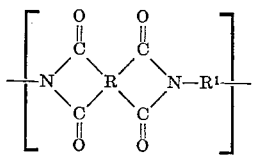

where R is a tetravalent aromatic organic radical including the following and substituted derivatives thereof:

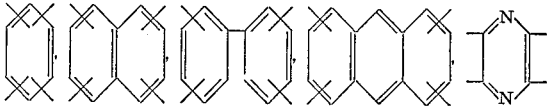

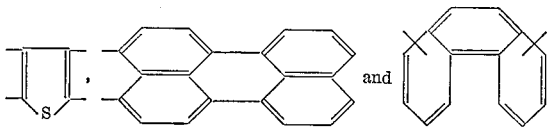

such as obtained from a dianhydride of the formula (2)
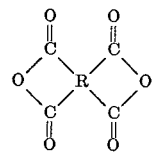

where R has the same meaning as above; and where $R^1$ is a divalent aromatic radical (arylene), preferably one of the following groups: phenylene, naphthylene, biphenylene, anthrylene, furylene, benzfurylene, and (3)
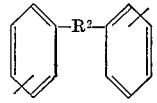

where $R^2$ is alkylene of 1-3 carbon atoms, oxygen, sulfur, or one of the following:

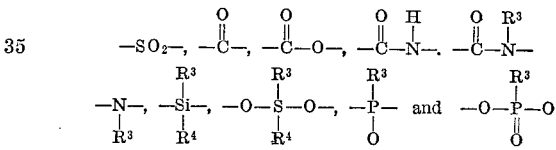

wherein $R^3$ and $R^4$ are alkyl or aryl, and substituted groups thereof. The $R^1$ groups are conveniently derived from organic diamines having the formula $$H_2N—R^1—NH_2$$

where $R^1$ is as defined above.

Illustrative of preferred polyimides useful as the base layer are those derived from dianhydrides in the following groups:

pyromellitic dianhydride;
2,3,6,7-naphthalene tetracarboxylic dianhydride;
1,2,5,6-naphthalene tetracarboxylic dianhydride;
3,4,9,10-perylene tetracarboxylic dianhydride;
naphthalene-1,2,4,5-tetracarboxylic dianhydride;
naphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
pyrazine-2,3,5,6-tetracarboxylic dianhydride;
benzene-1,2,3,4-tetracarboxylic dianhydride;
thiophene-2,3,4,5-tetracarboxylic dianhydride; etc.

Further illustrative of preferred polyimides useful as the base layer are those derived from diamines in the following group:

meta-phenylene diamine;
paraphenylene diamine;
2,2-bis(4-aminophenyl)propane;
4,4'-diaminodiphenyl methane;
4,4'-diaminodiphenyl sulfide;
4,4'-diaminodiphenyl sulfone;
3,3'-diaminodiphenyl sulfone;
4,4'-diaminodiphenyl ether;
2,6-diaminopyridine;
bis(4-aminophenyl)diethyl silane;
bis(4-aminophenyl)diphenyl silane;
benzidine;
3,3'-dichlorobenzidine;
3,3'-dimethoxybenzidine;
bis(4-aminophenyl)ethyl phosphine oxide;
4,4'-diaminobenzophenone;
bis(4-aminophenyl)phenyl phosphine oxide;
bis(4-aminophenyl)-N-butylamine;
bis(4-aminophenyl)-N-methylamine;
1,5-diaminonaphthalene;
3,3'-dimethyl-4,4'-diaminobiphenyl;
N-(3-aminophenyl)-4-aminobenzamide;
4-aminophenyl-3-aminobenzoate;
2,4-bis(beta-amino-t-butyl)toluene;
bis(p-beta-amino-t-butylphenyl)ether;
p-bis(2-methyl-4-aminopentyl)benzene;
p-bis(1,1-dimethyl-5-aminopentyl)benzene;
m-xylylene diamine;
p-xylylene diamine;
bis(4-aminophenyl)-N-phenylamine;

and mixtures thereof.

The polyimides which according to the present invention provide the particularly beneficial results when applied as a coating onto the polyimides of the Formula 1 above are those of a much narrower group of polyimides. Thus, the coating within the scope of this invention are characterized by a recurring unit having the formula (4)
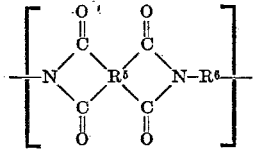

where R⁵ is (5)
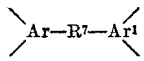

where Ar is phenylene, Ar¹ is phenylene, biphenylene or naphthalene, and R⁷ is —O—, —S—,

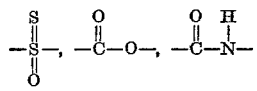

carbonyl or alkylene of 1 through 3 carbons; and R⁶ is alkylene of 7 through 10 carbons or the following:

(6)
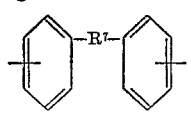

where R⁷ has the same meaning as above.

In the recurring unit shown by Formula 4 each carboxyl group is attached to a separate carbon atom of the aromatic radicals of R⁵, the carboxyl groups on each ring being ortho to each other.

The base polyimides can also be readily obtained by reaction of a suitable dianhydride and a diamine.

Illustrative of preferred polyimides useful as the coating layer according to the present invention are those derived from dianhydrides in the following group:

2,3,2',3'-benzophenone tetracarboxylic dianhydride
3,4,3',4'-benzophenone tetracarboxylic dianhydride
benzoyl pyromellitic dianhydride
6-(3',4'-dicarboxybenzoyl)-2,3-naphthalene dicarboxylic dianhydride
4'-(3'',4''-dicarboxybenzoyl)-3,4-diphenyl dicarboxylic dianhydride
4-(3',4'-dicarboxybenzoyloxy)phthalic dianhydride
4-(3',4'-dicarboxybenzamido)phthalic dianhydride
bis(3,4-dicarboxyphenyl) ether dianhydride
bis(3,4-dicarboxyphenyl) sulfide dianhydride
bis(3,4-dicarboxyphenyl) sulfone dianhydride
bis(2,3-dicarboxyphenyl) methane dianhydride
bis(3,4-dicarboxyphenyl) methane dianhydride
1,1-bis(2,3-dicarboxyphenyl) ethane dianhydride
1,1-bis(3,4-dicarboxyphenyl) ethane dianhydride
2,2-bis(2,3-dicarboxyphenyl) propane dianhydride
2,2-bis(3,4-dicarboxyphenyl) propane dianhydride and position isomers of the above.

Further illustrative of preferred polyimides useful as the coating layer according to the present invention are those derived from diamines in the following groups:

heptamethylene diamine
3,3-dimethylpentamethylene diamine
3-methylhexamethylene diamine
3-methylheptamethylene diamine
2,5-dimethylhexamethylene diamine
octamethylene diamine
nonamethylene diamine
1,1,6,6-tetramethylhexamethylene diamine
2,2,5,5-tetramethylhexamethylene diamine
4,4-dimethylheptamethylene diamine
decamethylene diamine
4,4'-diamino benzophenone
4-aminophenyl-3-aminobenzoate
3,4'-diaminobenzanilide
bis(4-aminophenyl) ether
bis(4-aminophenyl) sulfide
bis(4-aminophenyl) methane
1,1-bis(4-aminophenyl) ethane
2,2-bis(4-aminophenyl) propane
3,3'-diamino benzophenone
2,2'-diamino benzophenone and position isomers of the above.

In the polyimides within the scope of this invention, the mole ratio of diamine to tetracarboxy constituent, expressed as acid, will ordinarily be in the range from 0.95:1.05 to 1.05:0.95. Mixtures of two or more diamines and/or two or more tetracarboxy constituents are contemplated.

It will be understood that the polyimides referred to above are described in terms of the diamine and tetracarboxylic acid or dianhydride derived components but that the tetracarboxylic acid component can in preparation of the polyimide be also derived from the corresponding tetra-esters, diester diacid chlorides, diimides, or other suitable forms. The use of dianhydrides has particular advantages.

The heat-sealable polyimide articles of this invention are obtained by applying to the base polyimide a coating or surface layer of a precursor of the desired polyimide described above, followed by conversion of the precursor to the polyimide. Coating thicknesses in the range from about 0.05 to about 1.0 mil are satisfactory. The base polyimide will of course be different from the coating polyimide.

Among the suitable polyimide precursors can be mentioned polyiminolactones described in Angelo U.S. application Ser. No. 325,479, filed Nov. 21, 1963, now U.S. Patent 3,282,898; polyamide-acids described in Edwards U.S. application Ser. No. 95,014, filed Mar. 13, 1961, now U.S. Patent 3,179,614; polyamide-esters described in Sorenson U.S. application Ser. No. 288,535, filed June 17, 1963, now U.S. Patent 3,312,663; Angelo U.S. application Ser. No. 311,307, filed Sept. 25, 1963, now U.S. Patent 3,316,211; Angelo U.S. application Ser. No. 311,326, filed Sept. 25, 1963, now U.S. Patent 3,282,897; and Tocker U.S. application Ser. No. 332,889, filed Dec. 23, 1963, now U.S. Patent 3,326,851; polyamide-amides described in Angelo & Tatum U.S. application Ser. No. 325,442, filed Nov. 21, 1963, now U.S. Patent 3,316,212; poly(tetrazole-acids) described in Tatum & Thornton U.S. application Ser. No. 325,469, filed Nov. 21, 1963, now U.S. Patent 3,326,863; etc. The precursor can then be readily converted to the polyimide as disclosed in these aforementioned applications.

In an alternative method, the polyimide coating can be applied as a solution of the polyimide itself in antimony trichloride.

Pretreatment of the polyimide substrate to which the polyimide coating is to be applied is beneficial in some cases but is not essential. If desired, the substrate can be given an adhesion-promoting treatment such as a chemical treatment with an alkali as described in Lindsey U.S. application Ser. No. 411,126, filed Nov. 13, 1964, or with now U.S. Patent No. 3,361,589, issued Jan. 2, 1968, or with polyethylene imine as described in British patent specification No. 910,875. Alternatively, a flame or spark treatment can be given as described in Traver U.S. Patent No. 3,018,189, issued Jan. 23, 1964.

The invention will be more clearly understood by reference to the following examples wherein parts and percentages are by weight unless otherwise indicated. These examples illustrate specific embodiments of the present invention and should not be construed to limit the invention in any way.

EXAMPLE 1

A 1 mil film of the polypyromellitimide of bis-(4-aminophenyl) ether was coated continuously in a coating tower on both sides with a 20% solution of the polyamide-acid of 3,4,3',4'-benzophenone tetracarboxylic acid and bis(4-aminophenyl) ether in N,N-dimethylacetamide. Drying of the coating and conversion of the polyamide-acid to polyimide were achieved in one pass through the 3 heated zones of the tower, which were in consective order at temperatures of 120° C., 150° C., and 315° C. The coating on each side was about 0.5 mil thick. When this film was bonded to itself at 425° C., 10 seconds dwell time and 20 p.s.i., the bond strength was 1140 grams per inch, as indicated by the average of several tests on a Suter peel tester. On standing eight months at room temperature in air, sealability of the coated, unsealed film decreased but only to the level of about 400–800 grams per inch peel test level. The original sample after standing 40 days at room temperature in air was heat-sealed at 425° C., 10 seconds dwell time and 20 p.s.i. to a 1 mil uncoated film of the polypyromellitimide of bis(4-aminophenyl) ether, giving a peel strength of 600 grams per inch as indicated by the average of several tests on a Suter peel tester.

EXAMPLE 2

A 2 mil film of the polypyromellitimide of bis-(4-aminophenyl) ether was immersed for 5 minutes in a 10% by weight aqueous solution of sodium hydroxide. The film was washed with water, then 10% aqueous hydrochloric acid and then water, followed by drying. This surface-treated film was then coated on one side with the polyamide-acid solution of Example 1, dried for 2–3 hours at 140° C. to remove the bulk of the solvent, and then heated for 30 minutes at 300° C. to complete the drying and convert the polyamide-acid to a 1 mil layer of polyimide. Heat-sealability of a sample of the coated side of this film to itself at 400° C., 20 seconds dwell time and 20 p.s.i. was about 1,000 grams per inch (peel bonds), as indicated by the average of several tests on the Suter peel tester. A second sample of the coated film was stored at room temperature for 8 months and then heat-sealed to itself under the conditions described above. Tests on the Suter peel tester showed a peel strength of the same magnitude.

EXAMPLE 3

A 1 mil film of the polypyromellitimide of bis-(4-aminophenyl) ether was coated on both sides in a steam-heated solvent coating tower at 120° C. with a 15% solution of the polyamide-acid of 3,4,3',4'-benzophenone tetracarboxylic acid and bis(4-aminophenyl) methane in N,N-dimethylacetamide followed by drying and conversion to the corresponding polyimide on a pin frame dryer at temperatures in the range of 350–450° C. The coating was about 0.15 mil thick. When sealed to itself at 425° C., 10 seconds dwell time and 20 p.s.i., the sealability was 700 grams per inch. A second sample of the coated film was stored at room temperature for 37 weeks and then heat sealed to itself under the same conditions. Tests on the Suter peel tester showed a sealability of about 220 grams per inch.

EXAMPLE 4

When Example 3 was repeated, using a polypyromellitimide film which had been pretreated with a thin layer about 2 to 4 times the thickness of a monomoleucular layer of polyethylene imine, the same initial sealability value was obtained. This good value was retained for nearly nine months on storage of the polyimide coated but unsealed polypyromellitimide film.

EXAMPLE 5

A 1 mil film of the polypyromellitimide of bis(4-aminophenyl) ester was coated on one side with a 0.5 mil layer of the polyimide of 3,4,3',4'-benzophenone tetracarboxylic acid and 2,2-bis(4-aminophenyl) propane, by application of its polyamide-acid solution, followed by drying and imidizing. Coated-to-coated seals at 400° C. as above had peel strengths of about 2700 grams per inch.

EXAMPLE 6

Bis(4-aminophenyl) ether ʌ6.6 grams, 0.033 mole) was dissolved in 50 milliliters of dry acetone and 3.34 grams of triethylamine (0.033 mole) was added. To this a solution of 5.0 grams (0.0165 mole) of m-xylene-4,6-disulfonyl chloride in 50 milliliters of acetone was added very slowly with stirring. After a short time the salt began to precipitate. After the mixture had stood overnight, the salt was removed by suction filtration and the filtrate evaporated to dryness to give a dark semi-solid mass.

About 50 milliliters of N,N-dimethylacetamide was used to dissolve this semi-solid diamine, and 3.6 grams of pyromellitic dianhydride was added. An additional 9 milliliters of solvent was added, to give a 20% solids solution of the corresponding polyamide-acid.

This solution was coated onto a film of the polypyromellitimide of bis(4-aminophenyl) ether. The coated film was dried in a 100° C. oven for 1 hour and then a 300° C. oven for 30 minutes. Heat seals at 350° C. and 400° C., 10 seconds dwell time and 20 p.s.i. were 280 and 350 grams per inch, respectively, as measured on the Suter peel tester.

The foregoing examples can be repeated, as will be readily understood by persons skilled in this art, by substituting other materials such as those listed above for those of the specific exemplifications.

It is to be understood that the foregoing detailed description is given merely by way of illustration and that many variations may be made therein without departing from the spirit or scope of this invention.

The invention claimed is:

1. An article comprising a heat-sealable laminar structure of at least two layers of polyimide polymer firmly bonded to each other, each said polyimide being of an organic primary diamine and an aromatic tetracarboxylic acid, the mole ratio of said diamine to said acid being in the range from 0.95:1.05 to 1.05:0.95, the polyimide of one of said layers being characterized by a recurring unit having the following structural formula:

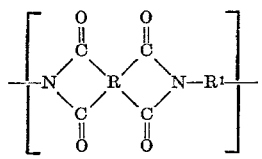

where R is selected from the group consisting of

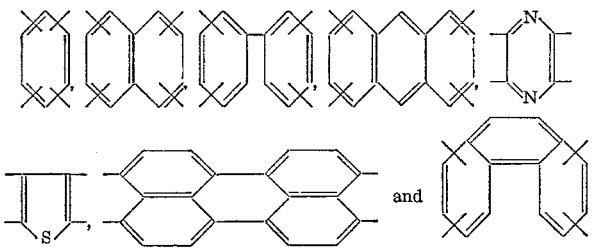

and $R^1$ is selected from the group consisting of phenylene, naphthylene, biphenylene, anthrylene, furylene, benzfurylene and

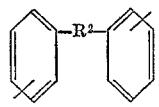

where $R^2$ is selected from the group consisting of alkylene of 1–3 carbon atoms, oxygen, sulfur,

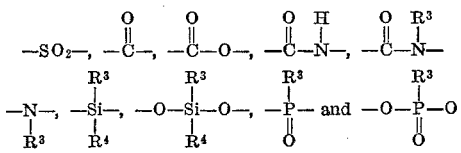

wherein $R^3$ and $R^4$ are selected from the group consisting of alkyl and aryl; and the polyimide of the other of said layers being different from the polyimide of the first layer and being characterized by a recurring unit having the following structural formula:

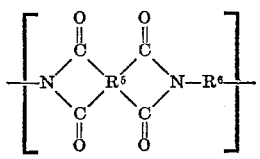

where $R^5$ is

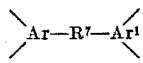

where Ar is phenylene; $Ar^1$ is selected from the group consisting of phenylene, biphenylene and naphthylene; and $R^7$ is selected from the group consisting of —O—, —S—,

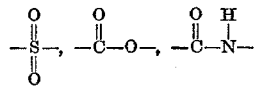

carbonyl and alkylene of 1 through 3 carbons; and $R^6$ is

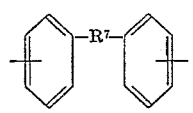

where $R^7$ has the same meaning as before.

2. The laminar structure of claim 1 wherein the polyimide of the other of said layers is of an organic diamine and an aromatic tetracarboxylic acid, the mole ratio of said diamine to said acid being in the range from 0.95:1.05 to 1.05:0.95, said diamine being selected from the group consisting of 4,4'-diamino benzophenone, 4-aminophenyl-3-aminobenzoate and N-(3-aminophenyl)-4-aminobenzamide; and said tetracarboxylic acid is selected from the group consisting of 2,3,2',3'-benzophenone tetracarboxylic acid; 3,4,3',4'-benzophenone tetracarboxylic acid; benzoyl pyromellitic acid; 6-(3'',4''-dicarboxybenzoyl)-3,3-naphthylene dicarboxylic acid; 4'-(3'',4''-dicarboxybenzoyl)-3,4-diphenyl dicarboxylic acid; 4-(3',4'-dicarboxybenzoyloxy)-phthalic acid; 4-(3',4'-dicarboxybenzamido)phthalic acid; bis(3,4-dicarboxyphenyl) ether; bis(3,4-dicarboxyphenyl) sulfide; bis(3,4-dicarboxyphenyl) sulfone; bis(2,3-dicarboxyphenyl) methane; bis(3,4-dicarboxyphenyl) methane; 1,1-bis(2,3-dicarboxyphenyl) ethane; 1,1-bis(3,4-dicarboxyphenyl) ethane; 2,2-bis(2,3-dicarboxyphenyl) propane, 2,2-bis(3,4-dicarboxyphenyl) propane.

3. The method of improving the heat-sealability of a film of a first polyimide which comprises applying to a surface of said film a thin coating of a second polyimide, each said polyimide being of an organic primary diamine and an aromatic tetracarboxylic acid, the mole ratio of said diamine to said acid being in the range from 0.95:1.05 to 1.05:0.95, said first polyimide being characterized by a recurring unit having the following structural formula:

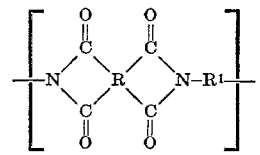

where R is selected from the group consisting of

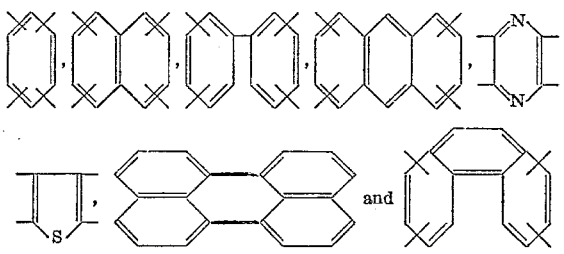

and $R^1$ is selected from the group consisting of phenylene, naphthylene, biphenylene, anthrylene, furylene, benzfurylene and

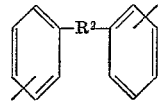

where $R^2$ is selected from the group consisting of alkylene of 1–3 carbon atoms, oxygen, sulfur,

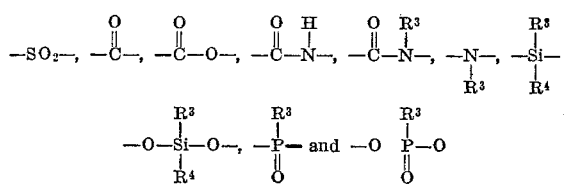

wherein $R^3$ and $R^4$ are selected from the group consisting of alkyl and aryl; and said second polyimide being characterized by a recurring unit having the following structural formula:

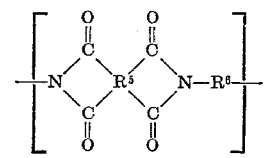

where $R^5$ is

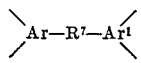

where Ar is phenylene; $Ar^1$ is selected from the group consisting of phenylene, biphenylene and naphthylene; and $R^7$ is selected from the group consisting of —O—, —S—,

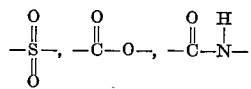

carbonyl and alkylene of 1 through 3 carbons; and $R^6$ is

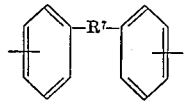

where $R^7$ has the same meaning as before.

4. The method of claim 3 wherein there is applied to a surface of said film a thin coating of a precursor of a second polyimide and thereafter converting said precursor to said second polyimide, each said polyimide being of an organic primary diamine and an aromatic tetracarboxylic acid, the mole ratio of said diamine to said acid being in the range from 0.95:1.05 to 1.05:0.95, said first polyimide being characterized by a recurring unit having the following structural formula:

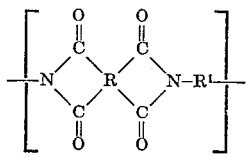

where R is selected from the group consisting of

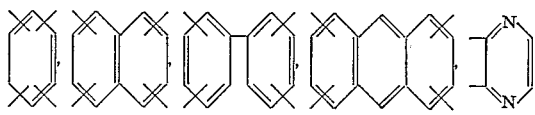

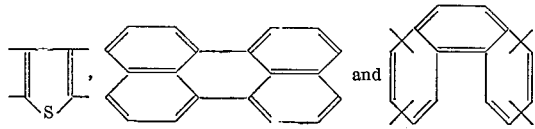

and $R^1$ is selected from the group consisting of phenylene, naphthalene, biphenylene, anthrylene, furylene, benzfurylene and

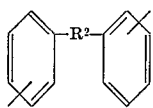

where $R^2$ is selected from the group consisting of alkylene of 1-3 carbon atoms, oxygen, sulfur,

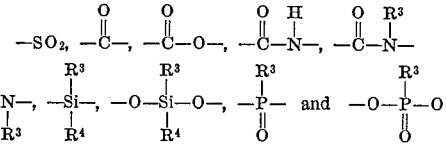

wherein $R^3$ and $R^4$ are selected from the group consisting of alkyl and aryl; and said second polyimide being characterized by a recurring unit having the following structural formula:

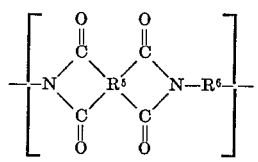

where $R^5$ is

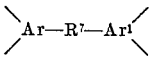

where Ar is phenylene; $Ar^1$ is selected from the group consisting of phenylene, biphenylene and naphthylene; and $R^7$ is selected from the group consisting of —O—, —S—,

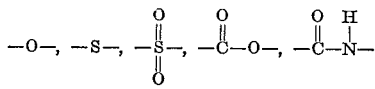

carbonyl and alkylene of 1 through 3 carbons; and $R^6$ is

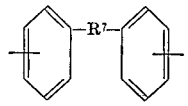

where $R^7$ has the same meaning as before.

References Cited

UNITED STATES PATENTS 3,179,633   4/1965   Endrey _____ 260—78
3,371,009   2/1968   Traynor et al. _____ 161—227

DOUGLAS J. DRUMMOND, Primary Examiner
C. B. COSBY, Assistant Examiner

U.S. Cl. X.R.

161—93; 117—138, 161; 260—78, 841

PO-1050
(5/69)

UNITED STATES PATENT OFFICE
CERTIFICATE OF CORRECTION

Patent No. 3,505,168          Dated April 7, 1970

Inventor(s) James F. DUNPHY and Darrell J. PARISH

It is certified that error appears in the above-identified patent and that said Letters Patent are hereby corrected as shown below:

Column 7, line 24, "seleced" should be -- selected --.

Column 8, line 62, the formula reading

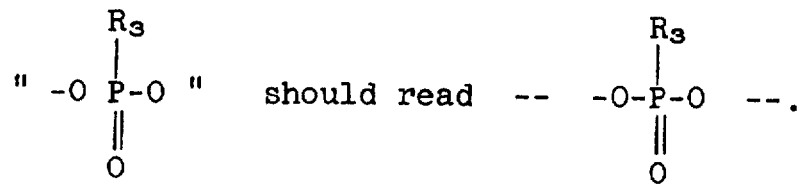

Column 9, lines 42-46, the structural formula reading

     should read     

Column 10, line 31, cancel the terminal expression reading " -O-, -S-, ".

SIGNED AND
SEALED
SEP 15 1970

(SEAL)
Attest:

Edward M. Fletcher, Jr.
Attesting Officer

WILLIAM E. SCHUYLER, JR.
Commissioner of Patents